United States Patent
van Bemmel

(10) Patent No.: US 7,711,799 B2
(45) Date of Patent: May 4, 2010

(54) METHOD AND APPARATUS FOR PRE-PACKETIZED CACHING FOR NETWORK SERVERS

(75) Inventor: Jeroen van Bemmel, Leiden (NL)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1154 days.

(21) Appl. No.: 10/994,989

(22) Filed: Nov. 22, 2004

(65) Prior Publication Data
US 2006/0112185 A1 May 25, 2006

(51) Int. Cl.
G06F 15/16 (2006.01)

(52) U.S. Cl. .................. 709/219; 709/203; 709/217; 709/238; 709/242

(58) Field of Classification Search ............... 709/203, 709/535, 245–246, 217, 219, 238, 242
See application file for complete search history.

(56) References Cited

U.S. PATENT DOCUMENTS

| | | | | |
|---|---|---|---|---|
| 5,293,379 A | * | 3/1994 | Carr | 370/474 |
| 5,867,114 A | * | 2/1999 | Barbir | 341/107 |
| 6,021,426 A | * | 2/2000 | Douglis et al. | 709/200 |
| 6,757,708 B1 | * | 6/2004 | Craig et al. | 709/203 |
| 7,069,297 B2 | * | 6/2006 | Kimura et al. | 709/203 |
| 7,324,516 B2 | * | 1/2008 | Daniel et al. | 370/392 |
| 2002/0046099 A1 | * | 4/2002 | Frengut et al. | 705/14 |
| 2002/0181506 A1 | * | 12/2002 | Loguinov | 370/473 |
| 2002/0188631 A1 | * | 12/2002 | Tiemann et al. | 707/513 |
| 2003/0055881 A1 | * | 3/2003 | Ngo | 709/203 |
| 2003/0055915 A1 | * | 3/2003 | Ngo | 709/219 |
| 2003/0088649 A1 | * | 5/2003 | Weber | 709/219 |
| 2003/0172169 A1 | * | 9/2003 | Cheng | 709/230 |
| 2004/0032870 A1 | * | 2/2004 | Daniel et al. | 370/392 |
| 2004/0236824 A1 | * | 11/2004 | Millington et al. | 709/203 |
| 2007/0198687 A1 | * | 8/2007 | Kasriel et al. | 709/223 |

FOREIGN PATENT DOCUMENTS

| EP | 0 698 982 A | 2/1996 |
|---|---|---|
| EP | 05 25 7026 | 2/2006 |

OTHER PUBLICATIONS

Braun T et al: "Performance Evaluation and Cache Analysis of an ILP Protocol Implementation" Jun. 1, 1996, IEEE/ACM Transactions on Networking, IEEE/ACM, New York, NY, US, pp. 318-330 XP000591072 ISSN: 1063-6692.

* cited by examiner

Primary Examiner—Shawki S Ismail
(74) Attorney, Agent, or Firm—Wall & Tong, LLP

(57) ABSTRACT

A method and apparatus for caching client node requested data stored on a network server is disclosed. The method and apparatus comprise caching server responses at the pre-packetized level thereby decreasing response time by minimizing packet processing overhead, reducing disk file reading and reducing copying of memory from disk buffers to network interfaces.

13 Claims, 3 Drawing Sheets

METHOD AND APPARATUS FOR PRE-PACKETIZED CACHING FOR NETWORK SERVERS

FIELD OF THE INVENTION

The present invention relates to the field of managing information on a communications network and, more specifically, to caching information within a packet-switched communication network environment.

BACKGROUND OF THE INVENTION

Typical network servers, such as Web servers, video severs or file servers, as well as local operating systems, are designed to respond to client information or data requests as quickly as possible. Caching, or storing recently requested information, e.g., a data file, in memory buffers in anticipation of the next request, is a common approach used by network servers and local operating systems to decrease server response time.

For example, Web servers make heavy use of disk caches by storing recently requested HTML content in main memory buffers rather than on disk. This type of storage arrangement works well according to the locality-of-reference principle; namely, it is likely recently stored content will be requested again soon.

Packet-switched communications networks such as Ethernet-type local area networks (LANs) or the Internet are commonly used in host/host or server/client environments. Typically, previously requested information retrieved by a server is cached for ready access and throughput the next time that information is requested. However, even though the requested data is cached, each new request for the same or substantially the same data prompts the server to create new packets (including the cached data as the payload) to be sent to the network interface for transmission.

For example, with respect to Web servers, known systems cache the results of URL resolves (e.g., mapping a URL to a file on a disk) and cache HTTP response headers per document, which may contain an HTTP response such as an HTTP 200 OK response, the date of last change, and the like. Thus, in these known systems, caching of the static content (e.g., HTTP response header and body) may be performed. Static content is generally content that is the same for all clients.

In a typical server/client packet-switched communications network, a client may send a data request to a server. Based upon the client request, the server retrieves a data file from a hard drive or floppy disk, separates the data file into packets and sends the packets to the client in response. Prior to sending the packets, the server must allocate memory buffers, one for each packet, to temporarily store the response data. In this process, the server must copy the entire data file from the hard drive or disk to local memory, packetize the data and store each packet in separate buffers. Copying all of the bytes of the requested information along with header information into memory buffers takes a considerable amount of time.

Thus, while the aforementioned caching techniques may decrease response time in packet-switched communications networks and the like, there is still a need for an improved method and apparatus for reducing average network server response time and improved throughput in packet-switched networks.

SUMMARY OF THE INVENTION

Various deficiencies within the prior art are addressed by the present invention of a method and apparatus for reducing the average response time for packet-switched network server responses and for improving throughput such that relatively more client nodes can connect to a network server without necessarily increasing network server hardware.

In accordance with an aspect of the present invention, there is provided a method for caching server response data. The method comprises: retrieving data from a server; separating the retrieved data into a plurality of response packets containing static and dynamic content; setting dynamic fields of at least one response packet to a predetermined fixed value; caching the dynamic fields and static fields of the at least one response packet to a memory buffer; and feeding the resulting at least one response packet from the memory buffer to a network interface for transmission over a communication network.

BRIEF DESCRIPTION OF THE DRAWINGS

The teachings of aspects of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

Aspects of the present invention are discussed below primarily in the context of a TCP/IP protocol suite for Web based servers sending HTML pages. However, it will be appreciated that the methodology of aspects of the present invention can readily be applied to other packet-switched transporting/networking protocols such as the User Datagram Protocol (UDP) (transport) for transmitting streaming video. Also, the examples given are described in terms of the IP v4 protocol, but aspects of the present invention can readily be applied to other versions of IP, for example, IP v6.

Aspects of the present invention improve server response time by caching known static and dynamic fields of requested information in predetermined formats in advance of sending a response packet to a client node request. Static content is generally content that is the same for all clients. Dynamic content is generally content that is different for each client or client request. Therefore, aspects of the present invention reduce the need to read and retrieve all bytes of the response data each time it is requested, which improves response time and increases throughput per client request.

Figure 1:
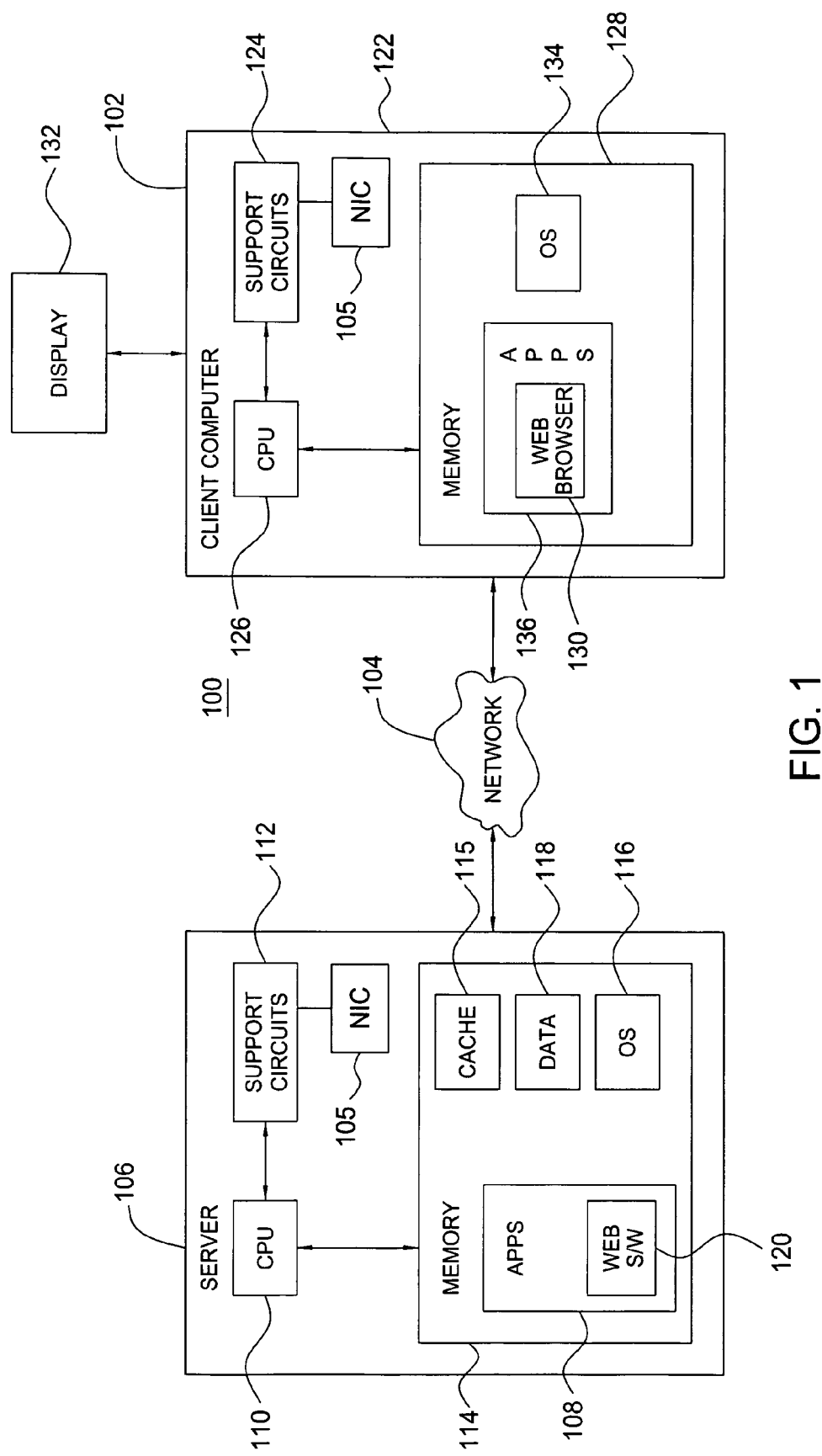
FIG. 1 depicts a functional block diagram of a communications network architecture that operates in accordance with aspects of the present invention.

FIG. 1 depicts a data communications network 100 in which embodiments of the present invention may be utilized. FIG. 1 portrays one variation of a plurality of possible data communications network configurations. For example, the network 100 of FIG. 1 optionally includes multiple host servers 106 and/or several client nodes or computers 102. For simplicity and clarity, only one host server 106 and client computer 102 are shown.

The data communications network 100 comprises a client node (or computer) 102 and a host server 106 communicating via a conventional packet switching data communications network 104 (e.g., the Internet, wide area network (WAN), an Ethernet (LAN) or wireless network such as a Wi-Fi network). The host server 106 is coupled to the network 104 via a network interface card (NIC) 105 to supply application and data services as well as other resource services to the client computer 102. The client computer 102 is also connected to a display 132.

The host server 106 comprises at least one central processing unit (CPU) 110, support circuits 112, and memory 114. The CPU 110 may comprise one or more conventionally available microprocessors. The support circuits 112 are well known circuits used to promote the functionality of the CPU 110. Such circuits may include but are not limited to a cache memory, power supplies, clock circuits, input/output (I/O) circuits, and the like. The memory 114 is coupled to the CPU 100 and may comprise random access memory (RAM), read only memory (ROM), removable disk memory, flash memory, and various combinations of these types of memory. The memory 114 is sometimes referred to as main memory and may, in part, include a location for cache memory or memory buffers 115 for temporarily storing retrieved data in packet format in response to a client request for a data file.

The memory 114 also generally stores the operating system software 116 of the server 106 and various forms of application software 108 and data 118. The operating system 116 may be one of a number of commercially available operating systems such as, but not limited to, SOLARIS from SUN Microsystems, Inc., AIX from IBM Inc., HP-UX from Hewlett Packard Corporation, LINUX from Red Hat Software, Windows 2000 from Microsoft Corporation, and the like.

The application software 108 may include Web server software 120 that comprises a variety of software programs responsible for accessing, storing, and/or maintaining "Web sites" and "Web pages" using a Transmission Control Protocol with Internet Protocol (TCP/IP) protocol suite. The application software may also include file server software programs responsible for storing, organizing, retrieving and maintaining data files using the File Transfer Protocol (FTP) application protocol. The application software may further include video server software for storing, organizing, retrieving and sending video data files using the User Datagram Protocol (UDP) transport protocol. Generally, the Web server software 120 provides access to data and information stored on the host server 106 via a "browser," or other device for retrieving and transferring data, to a remote computer (e.g., client computer 102). Although Web server software 120 is depicted, this may be understood to include file server software and/or video server software as previously mentioned.

The client computer 102 comprises a central processing unit (CPU) 126, support circuits 124, and memory 128. The client computer 102 may be any computer that can execute a browser and connect to the network 104. Such client computers include a personal computer, a personal digital assistant (PDA), a wireless device, or the like. The support circuits 124 are well known circuits used to promote the functionality of the CPU 126. Such circuits include but are not limited to cache, power supplies, clock circuits, I/O interface circuits, and the like. The memory 128 may comprise one or more of RAM, ROM, flash memory, removable disk storage, and the like. The memory 128 may store various software packages, such as application software 136 and operating system software 134. The application software 136 may contain a variety of programs, including but not limited to Web browser application software 130. It may also include client based file management software or video management software.

The Web browser 130 may be any software application that allows the user to locate and display HTML and other Web pages from the World Wide Web, or other communications network. Moreover, the Web browser 130 may be one of a number of commercially available browsers such as, but not limited to, Netscape Navigator, Microsoft Internet Explorer, and the like. Similarly, the client computer 102 is coupled to a display 132 via the support circuits 124 (i.e., I/O interface circuits). The display 132 may be any screen type device (i.e., cathode ray tube (CRT), plasma display, liquid crystal display (LCD), and the like) that displays data or images.

Figure 2A:
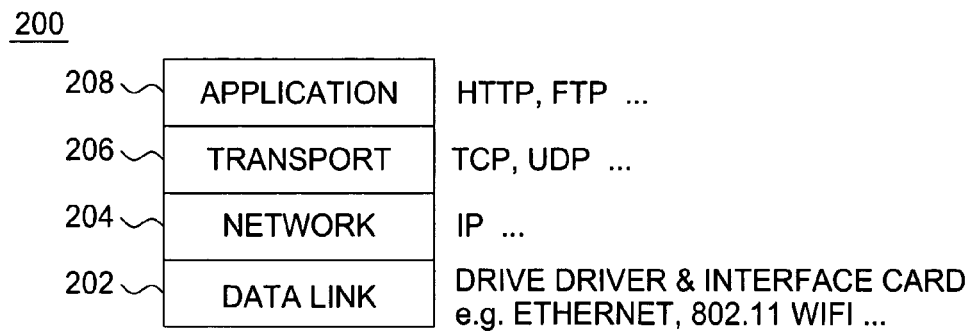
FIG. 2A depicts a sample TCP/IP stack used in connection with aspects of the present invention.

A telecommunication system, such as the one described in connection with FIG. 1, may use a networking protocol for sending and receiving packets of data. Networking protocols are normally developed in layers, with each layer responsible for a different facet of the communications. A protocol suite, such as the Transmission Control Protocol with Internet Protocol (TCP/IP), as an example, is a combination of different protocols at various layers. TCP/IP is normally considered a four layer system 200 as shown in FIG. 2A.

Specifically, the data link layer (or network interface layer) 202 normally includes the device driver in the OS 116 and corresponding network interface card (NIC) 105 in the support circuits 124 of the server 106. Together they handle all the hardware details of physically interfacing with the transmission media. The network (or internet) layer 204 handles movement of packets around the network. Routing of packets, for example, takes place here. For example, the IP provides the network layer in the TCP/IP protocol suite. Next, the transport layer 206 provides a flow of data between two hosts or a host and client computer(s) for the application layer 208 above.

In the TCP/IP protocol suite, there are at least two different transport protocols: TCP and User Datagram Protocol (UDP). TCP provides a reliable flow of data between two hosts or a host and client nodes (e.g., computers). It divides the data passed to it from the application layer 208 into appropriately sized portions or packets for the network layer 204 below, acknowledging received packets, setting timeouts to make certain the other end acknowledges packets that are sent, and so on. Because this reliable flow of data is provided by the transport layer 206, the application layer 208 can typically ignore all these details.

UDP, on the other hand, provides a much simpler service to the application layer 208. UDP just sends packets of data called datagrams from one host to the other or host to client nodes/computers, but there is no guarantee that the datagrams reach the other end. Any desirable reliability must be added by the application layer 208.

Finally, the application layer 208 handles the details of the particular application. There are many common TCP/IP applications that almost every implementation provides. For example, there are the File Transfer Protocol (FTP) and the HyperText Transfer Protocol (HTTP). The application layer 208 is not concerned with the movement of data across the network. The lower three layers typically do not receive information about the application layer 208 but handle all the communication details. Overall, normally, the application layer 208 is a user process, while the lower three layers are usually implemented in the OS 116.

Thus, the TCP/IP protocol stack, as discussed above, is designed to include different layers. Known systems keep all information cleanly separated within each layer and do not provide access to the aspects not associated with that layer. For example, the applications layer and the IP layer do not share information regarding the fragmentation of packets. The information about how certain data is going to be packetized remains in the IP layer. On the application layer, that knowledge should not be known. As a result, each time a client node data file request is to be satisfied, the host server 106 is required to copy all bytes from the retrieved data file and create an HTTP response packet, for instance. This takes a considerable amount of time.

It has been discovered by the inventor that, among other aspects of the present invention, relatively quicker responses with the same or less computer hardware is possible by taking advantage of and transferring lower layer information. Such information is sent to the higher layers in a TCP/IP protocol stack. Thus, in accordance with aspects of the present invention, knowledge is taken from the network layer 204 because this layer has the information regarding how data will be packetized. This information is taken to the application layer 208 and pre-applied before such information is sent in response. Hence, the response data is cached at a pre-packetized level.

The packet will be sent to the client node(s) using a socket interface. A socket interface is an abstraction for the connection between a client and network server. What happens inside socket is that the data is fragmentized into suitable sizes because the network may have a limit on the maximum amount of packet size it can support. This varies per type of network. For example, Local Area Networks (LANs) such as Ethernet allow only 1500 bytes per packet of payload.

Figure 2B:
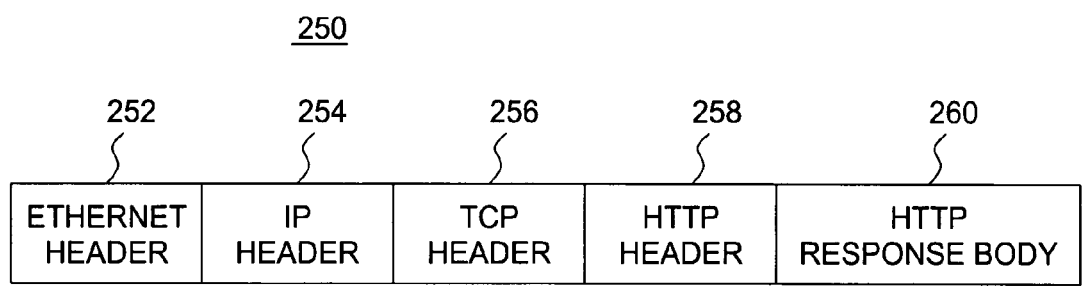
FIG. 2B is a sample HTTP response packet that may be generated by the communication network system of FIG. 1 and transmitted using the TCP/IP protocol of FIG. 2A.

One Web-server embodiment that may utilize the data communications network 100 of FIG. 1 comprises a server 106 that is capable of generating an HTTP response packet 250 such as that depicted in FIG. 2B in response to a client node (computer) 102 request for a data file, perhaps via a browser using Web browser software 130. This particular example packet 250, although alternatives are contemplated, includes an Ethernet header 252, an IP header 254, a TCP header 256, an HTTP header 258 and the HTTP payload or response body 260.

Thus, the sample HTTP response packet 250 is about a 1500 byte IP packet. This includes the headers mentioned above and the HTTP response body 260. The IP header 254 includes about 20 bytes. The TCP header 256 includes about 20 bytes. The remainder is about 1460 bytes. The HTTP header is larger because it is text-based. Only the first packet will contain the HTTP header. HTTP packets are separated into multiple IP packets. If the HTTP header is larger than 1500 bytes, it can have multiple packets which contain parts of the header. The rest of the HTTP body 260 is divided over the series of IP packets, chopped into pieces of 1500 bytes minus some header bytes.

Figure 3:
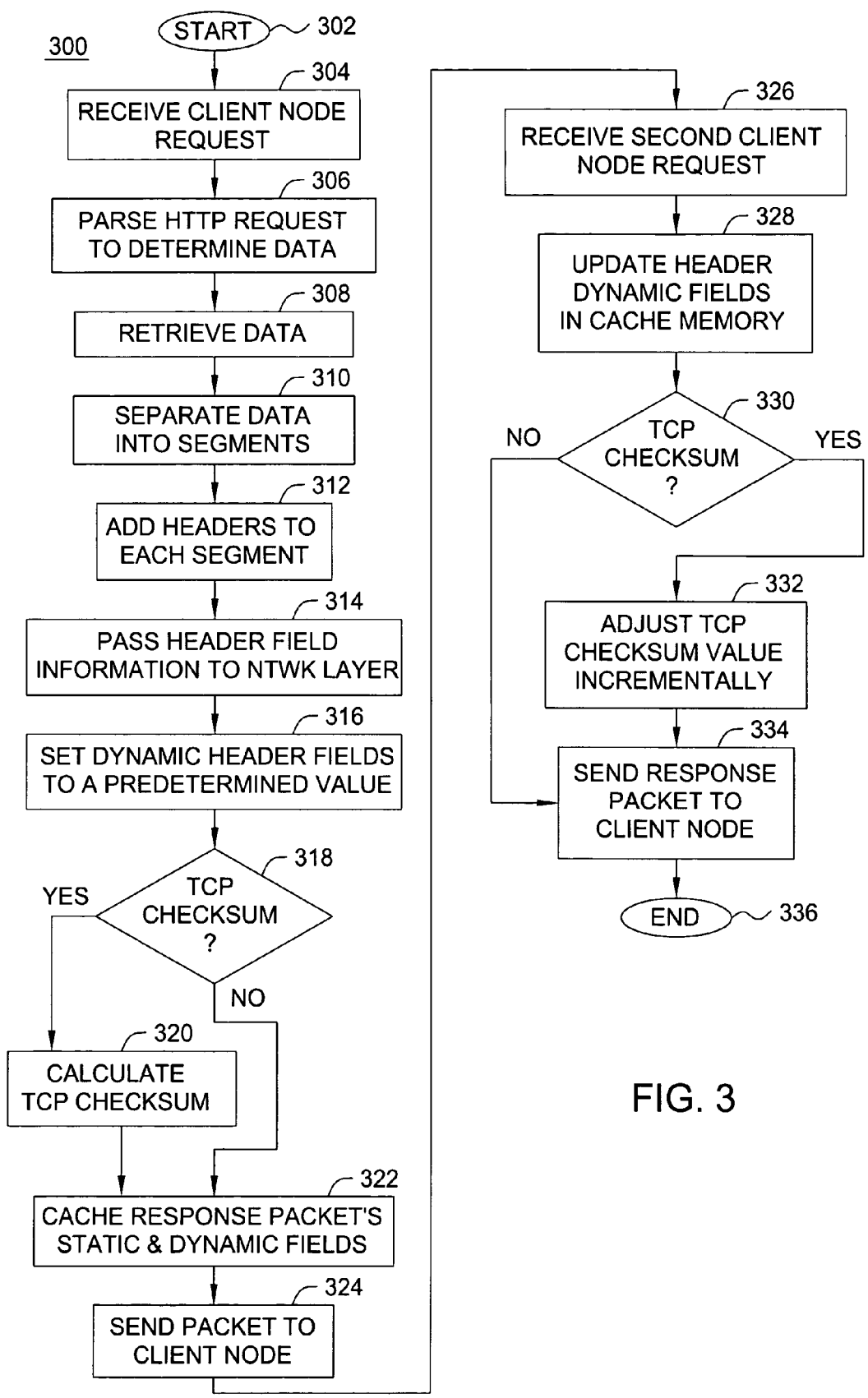
FIG. 3 depicts a flow diagram of a method according to aspects of the present invention.

In operation, as depicted in the flow chart of FIG. 3, and with reference to the communication system 100 of FIG. 1, in accordance with one aspect of the present invention, there is provided a client request session 300, which begins at step 302. At step 304, the server 106 receives a request from a client node 102, for example. In step 306, the server 106 processes this request by parsing the request to determine which data file is being requested. At step 308, a responsive data file is retrieved from memory 114.

At step 310, the data file is separated into segments or pre-packets. At step 312, header information is added to each segment. In accordance with aspects of the present invention, the header information for each segment is sent to a lower level of the TCP/IP stack 200 at step 314, which in this example is the network or IP layer 204.

Certain information from one data request to the next data request will remain the same, especially static content, and therefore can remain in a packet format and not have to be re-cached at the byte level. Therefore, for static content such as HTML pages on disk, the reply content will be mostly the same each time, except perhaps the following fields:

Ethernet destination MAC address (although it will be static in cases of
  a fixed LAN gateway)
IP destination address
TCP destination port
TCP sequence number; and
TCP checksum (if included), which must be updated each time.

There may be additional dynamic fields related to, for example, particular TCP headers in the request, but these could be accounted for by caching N copies of the response, one for each combination of headers. For example, a client may use TCP timestamp headers to estimate round trip times. The server would have to include such a header for that client but not for other clients. It would therefore cache (at least) two versions of the packetized reply, one with and one without this header. The timestamp field is a dynamic field that must be updated. In general, this applies to all possible combinations of reply headers. Such TCP headers are often optional and their usage depends on whether the client supports it.

In one example, each client will have a different MAC address within a local enterprise Ethernet network (from the data link layer 202). If there are different, remote networks, however, then the connections to go through an Ethernet switch is a MAC address of the switch. So, in the remote network case, from the perspective of the server 106, all packets are coming from the same Ethernet MAC address and it is fixed or static. With this knowledge, if the system is aware from the data link layer 202 below that it is an Ethernet network, then it knows how much data it can ultimately put in one packet. This is the information needed to separate the data file.

Thus, in step 316, the dynamic header fields, including those mentioned above, are set to a predetermined value so they can be cached in a pre-packetized manner in preparation for the next request. Optionally, and in this particular example, if a TCP transport protocol is used, then a TCP checksum value is included in the TCP header. At step 318, a check for a TCP checksum is made, which indicates if the system is using the TCP/IP protocol. If the response is yes, then at step 320, the TCP checksum value is calculated. Then the method proceeds to step 322. If the response is no, then the method proceeds directly to step 322, which indicates that the transport layer 206 is likely using a UDP protocol. At step 322, the resulting static and dynamic fields, including each header, in the response packet 250 are cached. Then, at step 324, the response packet is sent to the client node 102 that requested the data file.

At step 326, a second request is made from the same or different client node for the same or similar data. As certain of the information and header fields have been cached, it does not have to be retrieved again, byte by byte. Rather, only purely new information must be updated. Specifically, at step 328, the header dynamic fields in cache memory are updated to new predetermined values representing any changes in the header field information. In addition, step 330 inquires whether a TCP checksum is included. That is, if step 320 was previously performed and a TCP checksum value was included in the previously cached packet, then step 332 is performed to adjust the TCP checksum value incrementally. "Incrementally" means adding up all bytes in a packet, calculating a dual complement sum such that the sum of all bytes, including the check sum, is zero, one or some other predetermined fixed value. At step 334, a new response packet is sent to the second client node requesting the data file. At step 336, the method ends. It is to be understood that this process may be continuous and not end at step 336.

A typical network has restrictions on the maximum size of packets it can support. Different networks have different limits. For example, wireless networks have a limit of about 2300 bytes. ATM networks have 64 byte cells. On the IP layer, because of the standard, there is a maximum size for IP packets of 65536 bytes. But because the lower layer is already quite small, the IP packet is usually fit into the maximum packet size that can be supported by the network.

Although aspects of the present invention have been described with respect to web servers and HTML pages, the present invention can be used in file sharing as well. It can also be used in software updates where a central server in a pre-packetized form will store software updates and all clients in a given enterprise can download it. You can cache on different levels. Some web servers cache HTTP headers because they are mostly the same for each reply. Therefore, instead of renewing every time, they generate it once and just keep it. One just needs to copy the results instead of generating it again.

Because it is sequential, one can do that in advance, and when the packet is sent, the server only needs to add the things that have changed. So, with respect to the TCP checksum value, a method in accordance with aspects of the present invention would include calculating the checksum value in case all the fields are zero, and then when the packet is sent to the client, those fields are filled in, and only those bits that have changed are added.

For example, if one had a 1500 byte packet, there would be a need to calculate a checksum value performing 1500 additions (or 325 times a 4-byte addition as is typical for 32-bit computers). According to aspects of the present invention, the server would perform 1490 of those 1500 additions in advance, sum it up and generate new fields, which are put in specifically for the client. For example, the IP address, TCP destination port, TCP sequence number. These are a couple of fields that are client specific, different for each client. Thus, one needs to update the checksum but only for a few extra additions and not all 1500.

In UDP, check sum is optional for IP v4. It can be disabled. If it is not filled in, the checksum verification is skipped. Any transmission errors can only be detected at other layers (for example, the network layer or the application layer).

Thus, as discussed in more detail above, methods and apparatus according to aspects of the present invention utilized a caching function that caches data in pre-packetized form in an effort to decrease the response time of a client node request. The system takes information from the IP layer. That way, the system knows how the information is going to be packetized. Therefore, the system can take the information to application layer and pre-apply it. Various embodiments of the present invention, therefore, look at different protocol layers and optimizes based on the knowledge of the layer below. Through this manner, if used, TCP checksum calculation overhead is avoided, content compression (if any) overhead is avoided, reading of disk files is avoided and buffer allocation and copying of memory from disk buffers to network interfaces is avoided, to name a few advantages.

One skilled in the art will appreciate that all or part of methods and apparatus consistent with aspects of the present invention may be stored on or read from computer-readable media, such as secondary storage devices (e.g., hard disks, floppy disks, CD-ROM, DVD and the like); a carrier wave received from the Internet or other communications medium; or other forms of ROM or RAM. Finally, although specific components of data processing systems have been described, one skilled in the art will appreciate that a data processing system suitable for use with the exemplary embodiments may contain additional or different components, such as multiple processors and a variety of input/output devices. Generally speaking, the systems and methods of aspects of the present invention may be practiced in various tangible and intangible media, various computer and data processing systems, and the like.

As discussed, an advantage of an aspect of the present invention is manifested through overhead reduction. That is, not all bytes of a packet need to be re-packetized each time. The copying of all the bytes each time in known processes takes time. Packetizing can be performed and cached in advance, which reduces response time and load on the networked server 106. In turn, the same hardware is able to serve more client nodes (or computers) in the same amount of time. Or, less hardware is needed to serve the same number of client nodes.

Although aspects of the present invention have been described in terms of a Web server, it should be understood by one of ordinary skill in the art that other type servers, such as those mentioned above (i.e., file servers and video servers), are also contemplated and within the scope of the present invention.

For example, a video server may use UDP packets. Here, there is no flow control involved or dynamic sizing of data packets. There is just fixed sized packets. Thus, there is already pre-coding of video in data blocks. There may be multiple versions of same video file, for example, in different qualities or different CODEC for different clients. But the data still needs to be retrieved and put in a UDP packet and sent out on the network. Thus, in accordance with other aspects of the invention, there is provided a means for encoding a video file, storing it in a pre-packetized format on the video server. Each packet is ready to be sent out on the network interface.

Although various embodiments that incorporate the teachings of aspects of the present invention have been shown and described in detail herein, those skilled in the art can readily devise many other varied embodiments that still incorporate these teachings.

What is claimed is:

1. A method for caching server response data, comprising:
retrieving from a server at least a portion of data requested by a first client node;
separating the retrieved data into a plurality of response packets comprising static fields including static content of the retrieved data and dynamic fields including dynamic content of the retrieved data wherein the dynamic fields are selected from a group comprising: an Ethernet destination MAC address; an IP destination address; a TCP destination port; a TCP seciuence number: TCP headers from the client node request; and a TCP checksum;
adapting the dynamic fields for use in a subsequent response by setting at least one dynamic field of at least one response packet to a pre-defined value; and
caching the static fields and the adapted dynamic fields of the at least one response packet to a memory buffer for use in a response to a request by a second client node.

2. The method of claim 1, wherein the pre-defined value is zero.

3. The method of claim 1, further including setting an error detection value in a field of the at least one response packet.

4. The method of claim 3, wherein the error detection value is a TCP checksum value.

5. The method of claim 1, in response to the second client node request, further comprising:
updating at least one cached dynamic field with a dynamic content associated with the second client node request;
adjusting incrementally a TCP checksum value of at least one response packet wherein the at least one response packet includes the at least one updated dynamic field; and
providing to the second client node the at least one response packet having the incrementally adjusted TCP checksum value.

6. The method of claim 1, wherein, if the dynamic fields include TCP headers, the method further comprising caching N copies of the at least one response packet, wherein each copy includes a different combination of at least some of TCP headers associated with the at least one response packet and wherein N is a number of all possible combinations of the TCP headers associated with the at least one response packet.

7. A computer-readable storage medium having computer-executable instructions stored thereon, the computer-executable instructions, when executed by a computer, causing the computer to perform a method for caching at least one response packet on a server, comprising:
retrieving data from a memory database of the server, in response to a first client node request, to include a portion of the retrieved data in the at least one response packet the at least one response packet including static fields including static content of the retrieved data and dynamic fields including dynamic content of the retrieved data wherein the dynamic fields are selected from a group comprising: an Ethernet destination MAC address; an IP destination address; a TCP destination port; a TCP sequence number; TCP headers from the client request; and a TCP checksum;
adapting one or more dynamic fields of the at least one response packet for use in a response to at least a second client node request by setting the one or more dynamic fields of the at least one response packet to a pre-defined value; and
caching the adapted one or more dynamic fields and the static fields of the resulting at least one response packet in a memory buffer of the server for use in the response to the at least second client node request.

8. The computer-readable storage medium of claim 7, wherein the pre-defined value is zero.

9. The computer-readable storage medium of claim 7, further including setting an error detection value in a field of the at least one response packet.

10. The computer-readable storage medium of claim 9, wherein the error detection value is a TCP checksum value.

11. The computer-readable storage medium of claim 10, in response to the second client node request, the method further comprising:
updating values of the one or more dynamic fields of the at least one response packet with dynamic content associated with the second client node request;
adjusting incrementally a TCP checksum value of the at least one response packet; and
providing the at least one response packet having the updated one or more dynamic fields and the incrementally adjusted TCP checksum value to the second client node.

12. The computer-readable storage medium of claim 7, wherein, if the dynamic fields include TCP headers, the method further comprises: caching N copies of the at least one response packet, wherein each copy includes a different combination of at least some of TCP headers associated with the at least one response packet and wherein N is a number of all possible combinations of the TCP headers associated with the at least one response packet.

13. An apparatus for caching server response data, comprising:
means for retrieving data from a server requested by a first client node;
means for separating the retrieved data into a plurality of response packets comprising static fields including static content of the retrieved data and dynamic fields including dynamic content of the retrieved data wherein the dynamic fields are selected from a group comprising: an Ethernet destination MAC address; an IP destination address; a TCP destination port; a TCP sequence number; TCP headers from the client request; and a TCP checksum;
means for adapting the dynamic fields for use in a subsequent response by setting dynamic fields of at least one response packet to a pre-defined value; and
means for caching the adapted dynamic fields and the static fields of the at least one response packet to a memory buffer for use in a response to a second client node request for at least a portion of the data requested by the first client node.

* * * * *